Aug. 6, 1946.                J. P. BUTTERFIELD                2,405,400
                                RELEASABLE PIN
                              Filed Nov. 11, 1944
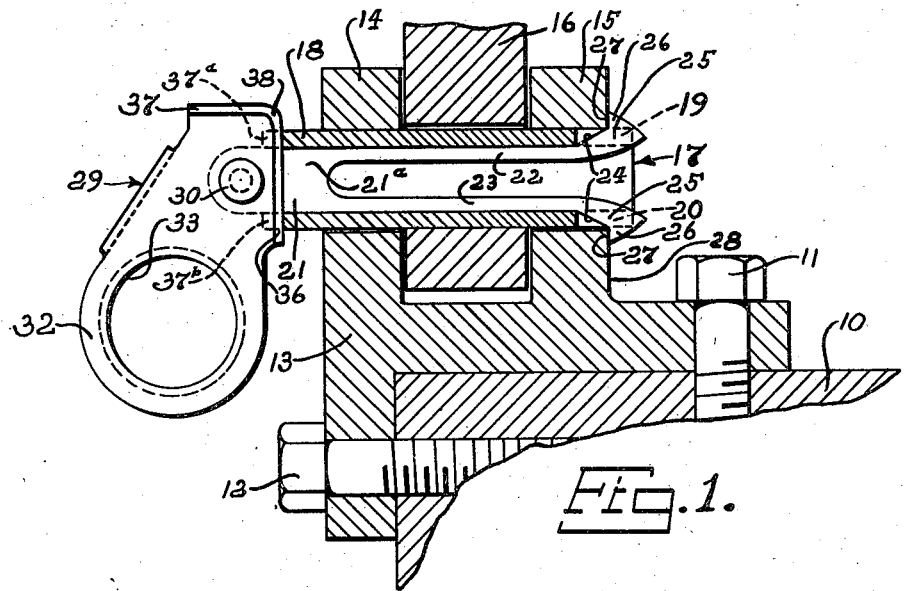
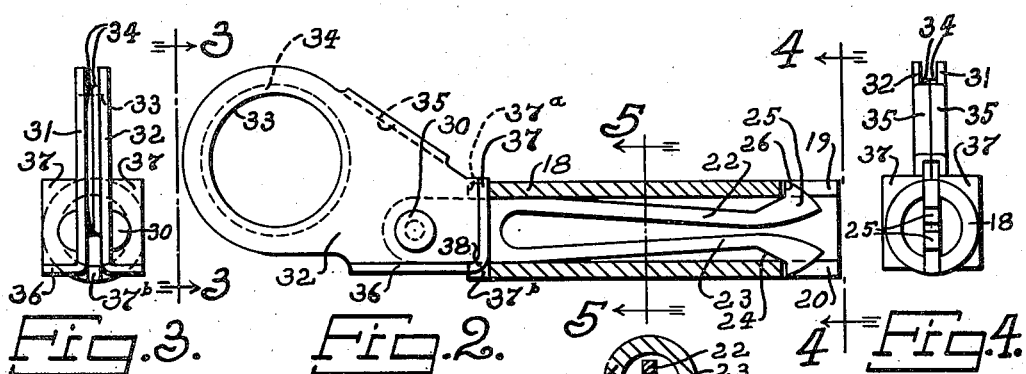
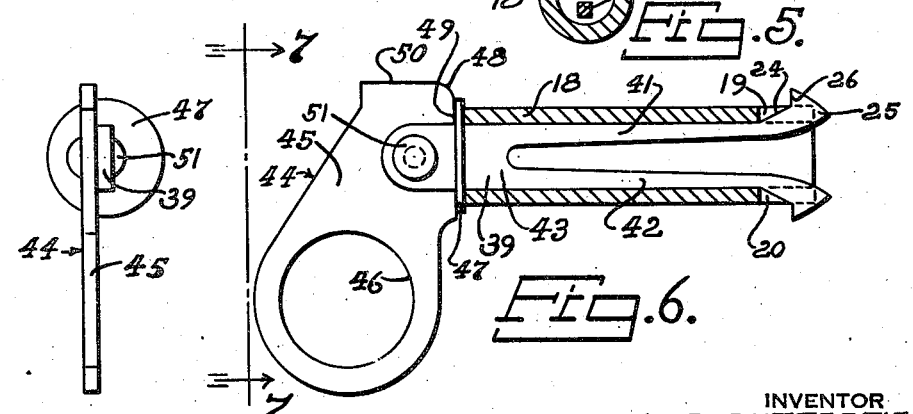
INVENTOR
JOHN P. BUTTERFIELD
BY
Harness and Harris
ATTORNEYS.

Patented Aug. 6, 1946

2,405,400

UNITED STATES PATENT OFFICE 2,405,400

RELEASABLE PIN

John P. Butterfield, Highland Park, Mich., assignor to Chrysler Corporation, Highland Park, Mich., a corporation of Delaware Application November 11, 1944, Serial No. 563,073

14 Claims. (Cl. 85—5)

This application relates to a construction for holding parts together. More specifically it relates to a device adapted to be inserted through openings in parts for holding them in assembled relation, which device is releasably maintained in assembled position with the parts for quick attachment thereto and detachment therefrom.

It is well known to provide a construction for joining parts that involves a pin-like structure extending through them for holding them together. It is a considerable problem to design the construction so that the structure is not easily dislodged from the parts held together as by accident and yet is easily removable from these parts when their disassociation is intended. I have invented a structure of this sort.

An object of the present invention is to provide improvements in a device for holding parts in assembled relation.

A further object is the provision of an improved pin-like structure for holding parts together, which structure is easily attached and detached and yet is safe from accidental detachment.

Another object is to provide a simplified and less costly construction of a releasable pin-like structure for holding parts together.

Other objects will appear from the disclosure.

In the drawing:

Fig. 1 is a view, partially in section, of the novel releasable pin of the present invention and of parts held together by the pin;

Fig. 2 is a view, partially in section, of the holding pin in Fig. 1 in a different position of adjustment;

Fig. 3 is an end view of the pin of Fig. 2, taken on the line 3—3 of Fig. 2;

Fig. 4 is an end view of the pin of Fig. 2, taken on the line 4—4 of Fig. 2;

Fig. 5 is a sectional view taken on the line 5—5 of Fig. 2;

Fig. 6 is a view partially in section of a modified form of holding pin; and

Fig. 7 is an end view of the holding pin of Fig. 6, taken on the line 7—7 of Fig. 6.

The reference character 10 designates a supporting structure to which is attached by means of screws 11 and 12 a bracket 13 having spaced attaching portions 14 and 15. Between the portions 14 and 15 is positioned a part 16. The part 16 is held in place between the portions 14 and 15 by means of a pin or pin-like structure 17. The structure 17 includes a sleeve or tube 18, which fits relatively snugly in openings in the attaching portions 14 and 15 and the part 16 and resists movement of the part 16 with respect to the portions 14 and 15 in a direction transverse of the tube 18. The spacing of the portions 14 and 15 causes them to resist movement of the part 16 in the direction of the length of the tube or sleeve 18. The sleeve is of a length to project beyond both portions 14 and 15 and has at one end a pair of diametrically opposed slots 19 and 20. A member 21 is positioned within the sleeve 18 in a relatively close fit and is bifurcated or slotted from its right end as viewed in Fig. 1 to a region or left end portion 21a so as to be provided with opposed legs 22 and 23. The legs extend for the greater portion of the length of the member 21.

Each leg is provided at its end with a cam portion 24 having an exterior 25 extending both radially outwardly and axially of the sleeve 18 or in other words, diagonally outwardly of the sleeve 18. Each leg has also at its end immediately adjacent the cam portion 24 a blocking portion 26 having a surface 27 positioned generally in a plane extending at right angles to the axis of the sleeve 18. The surface 27 is engageable with an outer face 28 of the attaching portion 15 to prevent withdrawal of the sleeve 18 and the member 21 from the attaching portions 14 and 15 and the part 16 by movement of the sleeve 18 and the member 21 to the left as viewed in Fig. 1. The sleeve and member may be moved somewhat to the right of their position of Fig. 1 to remove the blocking portion 26 of each leg out of engagement with the part 15. The left end of the member 21 projects outwardly of the left end of the sleeve 18 and has pivotally connected to it a control element 29 by a suitable means such as a rivet 30. The control element 29 is conveniently formed of two similar sheet metal pieces 31 and 32, each having a large opening 33 provided with a flange 34, a flange 35 formed along one side, and flanges 36 and 37 along two other sides in closely related fashion. The flanges 34 abut one another and are metallically joined by soldering or welding, and the same thing is true of the flanges 35, the flanges 34 and 35 by being joined to one another constituting the joining means for the pieces 31 and 32 to one another. For each of the pieces 31 and 32 the flanges 36 and 37 are approximately at right angles to one another and are joined by an arcuate flange portion 38. The flange 36 is nearer the pivot of the control element 29 on the member 21 constituted by the rivet 30 than is the flange 37, and both of these flanges are nearer the pivot than is the flange portion 38.

The flange 36 and the flange 37 on the piece 31 are directed outwardly from the flange 36 and the flange 37 on the piece 32, respectively, thus constituting faces that engage the left end of the sleeve 18 in the positions of Figs. 1 and 2. Lugs 37ª and 37ᵇ on the left end of the sleeve 18 project into the space between the pieces 31 and 32, preventing rotation of the control element 29 about the axis of the sleeve 18. In the position of Fig. 1 the face constituted by the flanges 36 engages the left end of the sleeve 18, and movement of the member 21 with respect to the sleeve 18 is resisted, because engagement of the flanges 36 with the left end of the sleeve 18 brings the left end of the cam portions into engagement with the bases of the slots 19 and 20. With the parts of the pin-like structure 17 so arranged withdrawal of the structure from the portions 14 and 15 and the part 16 by movement to the left is prevented by engagement of the blocking portions 26 with the attaching portion 15, and withdrawal of the structure by movement to the right is prevented by engagement of the flanges 36 and the flange portions 38 with the attaching portion 14, the flanges 36 and the flange portions 38 projecting radially outwardly of the sleeve 18.

When it is desired to withdraw the pin 17 from the openings in the attaching portions 14 and 15 and the part 16, a finger is inserted in the opening 33 in the control element 29, and the control element is shifted angularly to bring the flanges 37 into contact with the left end of the sleeve 18, as seen in Fig. 2. This necessitates a shifting of the member 21 to the left with respect to the sleeve 18, causing the ends of the legs 22 and 23 to be moved inwardly toward one another because of sliding of the cam portions 24 of the legs 22 and 23 along the bases of the slots 19 and 20. Thus, the blocking portions 26 are moved radially inwardly from the position of Fig. 1, in which they are exterior or radially outward of the sleeve 18, to the position of Fig. 2, in which they are within the slots 19 and 20 and do not project beyond the outer diameter of the tube 18 at all or at least insufficiently to prevent withdrawal of the pin 17 from the hole in the attaching portions 14 and 15 and the part 16 by movement to the left. The inward bending of the legs 22 and 23 takes place at regions adjacent their juncture with the left end portions 21ª as indicated in Fig. 2. When the control element 29 is returned to its position of Fig. 1 the resilience of the aforementioned leg juncture is sufficient to make the legs move outwardly, the cam portions 24 sliding along the bases of the slots 19 and 20 and shifting the member 21 to the right.

In the position of Fig. 2 the blocking portions 26 of the legs 22 and 23 are within the slots 19 and 20 of the sleeve 18 so as to be protected thereby. At least partial protection is afforded the cam portions 24 and the blocking portions 26 by the slots 19 and 20 in the position of Fig. 1, and incidentally the reverse is also true, i. e., partial protection from these portions of the legs is obtained.

The fact that the flanges 36 and 37 are straight as shown and the flange portion 38 connecting the flanges 36 and 37 is at a greater distance from the pivot of the control element 29 than are the flanges 36 and 37 makes the pin like structure 17 relatively stable either in the position of Fig. 1 or in the position of Fig. 2. If either position is assumed, the engagement of the one or the other set of straight flanges with the left end of the sleeve 18 tends to maintain the particular position. If the arcuate flange portions 38 engage the left end of the sleeve 18, the position is unstable, and the tendency will be for the structure to assume either the position of Fig. 1 or that of Fig. 2. As is to be seen from Fig. 3, the flanges 36, 37, and 38 extend outwardly from the pieces 31 and 32 sufficiently to cover a width about as great as the outer diameter of the sleeve 18, and thereby the arcuate flange portions 38 are prevented from becoming lodged in the left end of the sleeve 18.

The lugs 37ª and 37ᵇ, projecting into the space between the pieces 31 and 32 constituting the control element 29, prevent rotation of the control element about the axis of the sleeve 18. In this way retraction of the blocking portions 26 of the legs 22 and 23 through twisting of the legs is prevented.

The pin or pin-like structure of Figs. 6 and 7 differs from that of Figs. 1-5, inclusive, in several respects. The pin-like structure has a member 39 within the sleeve 18, which has opposed legs 41 and 42, which decrease in radial thickness in a direction from their juncture with the left end portion 43 toward their ends having the cam portions 24 and the blocking portions 26, located in and functioning with respect to the slots 19 and 20 in the sleeve 18. This variation in the thickness of the legs 41 and 42 provides a constant strength section for these legs. The pin of Figs. 6 and 7 has a control means 44, which is formed of a single piece 45 having a finger opening 46 and a washer 47, surrounding the left end of the member 39 and positioned between the piece 45 and the left end of the sleeve 18 so as to prevent entrance of an arcuate portion 48 in the left end of the sleeve 18. This portion connects two straight portions 49 and 50 generally at right angles to one another, portion 49 being nearer the pivotal connection of the piece 45 with the member 39 constituted by the rivet 51 than is the portion 50. With the straight portion 49 abutting the washer 47 as shown in Fig. 6, the pin of Figs. 6 and 7 is arranged like the pin 17 of Figs. 1-5, inclusive, in Fig. 1, i. e., for preventing withdrawal from parts it is to hold together, for the blocking portions of the legs 41 and 42 are radially outward of the sleeve 18. The pin of Figs. 6 and 7 is brought to a position corresponding to that of Fig. 2 by angular shifting of the piece 45, in which position the straight portion 50 engages the washer 47. This causes a movement of the member 43 to the left and a sliding of the cam portions 24 along the bases of the slots 19 and 20. Thus the legs 41 and 42 move inwardly toward one another, bringing the blocking portions 26 inwardly into nonblocking position. As is the case with the flanges 36, 37, and 38 of Figs. 1-5, inclusive, the straight portions 49 and 50 and the arcuate portion 48 cause the pin of Fig. 6 to assume either the position of Fig. 6 or the position, not shown, in which the straight portion 50 contacts the washer 47.

I claim:

1. A releasable pin for holding parts together through which the pin extends, said pin comprising a sleeve having opposed slots at one end, a member positioned within the sleeve and protruding from the opposite end of the sleeve and having a slot extending from the end adjacent the slotted end of the sleeve to a point adjacent the said opposite end of the sleeve so as to form legs having end portions with exterior surfaces projecting diagonally outwardly through the slots in the sleeve and radially outwardly beyond the sleeve for engagement with one of the parts, and a control part pivotally connected to the end of the member protruding from the said opposite end of the sleeve and having one surface spaced a certain amount from the connection of the part with the member adapted to engage the said opposite end of the sleeve for permitting the end portions of the legs on the member to project outwardly as aforesaid and another surface angularly related to the said one surface and spaced a greater amount from the connection of the part with the member adapted to engage the said opposite end of the sleeve for holding the radially outwardly projecting exterior surfaces of the end portions of the legs of the member in and adjacent the bases of the slots in the sleeve and the diagonally outwardly projecting exterior surfaces radially inwardly of the slots and displaced longitudinally of the sleeve from the bases of the slots toward the said opposite end of the sleeve for providing for withdrawal of the pin from the parts.

2. A releasable pin for holding parts by projecting therethrough, said pin comprising a sleeve, a member positioned within the sleeve and comprising a pair of opposed legs joined at one end so as to resist movement of the legs toward one another and having at the other end diagonally outwardly extending exterior surfaces and radially outwardly extending exterior surfaces, a control part connected at the said one end of the member for acting against the sleeve to move the diagonally outwardly extending surfaces of the member against the sleeve for forcing the legs toward one another and bringing the radially outwardly extending exterior surfaces from a position exterior of the sleeve blocking removal of the pin from the parts to a position within the outer diameter of the sleeve permitting withdrawal of the pin from the parts.

3. A releasable pin for holding parts by projecting therethrough, said pin comprising a sleeve and a member positioned within the sleeve and having a blocking portion positionable exterior of the sleeve for preventing withdrawal of the pin from the parts and a cam portion engageable with the sleeve for causing by axial movement of the member with respect to the sleeve the blocking portion to be retracted within the outer diameter of the sleeve for providing for withdrawal of the pin from the parts.

4. A releasable pin for holding parts by projecting therethrough, said pin comprising a sleeve, a member positioned within the sleeve and having one end projecting from one end of the sleeve, a blocking portion adjacent the other end of the sleeve positionable exterior of the sleeve for preventing withdrawal of the pin from the parts, and a cam portion engageable with the sleeve for causing by axial movement of the member with respect to the sleeve in a direction from the said other end toward the said one end, the blocking portion to be retracted within the outer diameter for providing for withdrawal of the pin from the parts, and a control part pivotally connected to the said one end of the member and engaging the said one end of the sleeve for acting through angular movement of the control part about its pivotal connection with the member to bring about the aforesaid axial movement of the member and retraction of the blocking portion thereof.

5. A releasable pin for holding parts by projecting therethrough, said pin comprising a sleeve, a pair of opposed legs positioned within the sleeve and having blocking portions at one end positionable exterior of opposite sides of the sleeve for preventing withdrawal of the pin from the parts and cam portions also at the one end engageable with the sleeve for causing by axial movement of the member with respect to the sleeve in a direction from the said one end toward the other end the said one end of the legs to be moved toward one another and the blocking portions to be retracted within the outer diameter of the sleeve for providing for withdrawal of the pin from the parts, means joining the other ends of the legs for resisting the movement of the said one end of the legs toward one another, and a control element pivotally connected to the said other ends of the legs so as to be angularly movable in contact with the sleeve for bringing about the aforesaid axial movement of the member.

6. A releasable pin for holding parts by projecting therethrough, said pin comprising a sleeve, a pair of opposed members positioned within the sleeve and having blocking portions positionable exterior of opposite sides of the sleeve for preventing withdrawal of the pin from the parts and opposed cam portions engageable with the sleeve for causing by axial movement of the members with respect to the sleeve the members to move toward one another and the blocking portions to be retracted within the outer diameter of the sleeve for providing for withdrawal of the pin from the parts, and means resisting movement of the members towards one another.

7. A releasable pin for holding parts by projecting therethrough, said pin comprising a sleeve, a member having one end projecting from one end of the sleeve and having a slot extending from the other end for a greater portion of the length of the member for the formation of opposed legs having at their ends adjacent the other end of the sleeve blocking portions positionable exterior of opposite sides of the sleeve for preventing withdrawal of the pin from the parts and cam portions adjacent the blocking portions engageable with the sleeve for causing axial movement of the member with respect to the sleeve from the said other end toward the said one end to retract the blocking portions within the outer diameter of the sleeve for providing for withdrawal of the pin from the parts, and a control element pivotally connected with the said one end of the member and having first and second portions extending at approximately right angles to one another and being selectively engageable with the said one end of the sleeve, the first portion being relatively closely spaced from the pivoted connection of the element with the member so as to cause when engaging the said one end of the sleeve to locate the member in the sleeve for positioning of the blocking portions of the member for preventing withdrawal of the pin from the parts, the second portion being relatively less closely spaced from the pivotal connection so as to cause when engaging the said one end of the sleeve to locate the member in the sleeve for positioning the blocking portions of the member for providing for withdrawal of the pin from the parts, the first and second portions of the control element being joined by an intermediate portion having a greater spacing from the pivotal connection than the first and second portions for urging the control element either to a position involving engagement of the first portion with the said one end of the sleeve or to a position involving engagement of the second portion with the one end of the sleeve.

8. The pin specified in claim 7, the control element comprising two parts having slightly spaced parallel body portions and along two sides outwardly directed flanges forming the first and second portions of the control element and along a third side and around a large central opening inwardly directed flanges bonded to one another for joining the two parts.

9. The pin specified in claim 7, the control element being formed of relatively thin sheet-like material, the pin further including a washer surrounding the member between the said one end of the sleeve and the control element for preventing entrance of the control element in the said one end of the sleeve.

10. The pin specified in claim 2, the legs decreasing in thickness from the end of the slot to the cam and blocking portions.

11. The pin specified in claim 2, the legs being uniform in thickness throughout substantially their entire length.

12. The pin specified in claim 7, the control element comprising spaced body portions, the said one end of the sleeve having lugs projecting between the spaced body portions for preventing retraction of the blocking portions of the legs through twisting of the legs caused by rotation of the control element about the axis of the sleeve.

13. The pin specified in claim 5, the sleeve having means for preventing rotation of the control element about the axis of the sleeve for preventing retraction of the blocking portion through twisting of the legs.

14. A releasable pin for holding parts by projecting therethrough, said pin comprising an outer member, and an inner member positioned within the outer member and having a blocking portion positionable to prevent withdrawal of the pin from the parts and a cam portion engageable with the outer member for causing by movement of the members with respect to one another the blocking portion to be retracted for providing for withdrawal of the pin from the parts.

JOHN P. BUTTERFIELD.